United States Patent [19]

Mottes

[11] 4,148,193
[45] Apr. 10, 1979

[54] METHOD AND APPARATUS FOR PRODUCING UNDERGROUND INSTALLATIONS OF CONCRETE PIPE

[76] Inventor: Samuel Mottes, 40 Yehuda Hanassi St., Tel Aviv, Israel

[21] Appl. No.: 854,225

[22] Filed: Nov. 23, 1977

[30] Foreign Application Priority Data

Dec. 8, 1976 [IL] Israel .................................... 51070

[51] Int. Cl.² ............................................... F16L 1/04
[52] U.S. Cl. .................................. 405/155; 405/150; 425/59
[58] Field of Search .................. 61/72.2, 72.7, 72.6, 61/72.5; 175/62, 53; 425/59

[56] References Cited

U.S. PATENT DOCUMENTS

| | | | |
|---|---|---|---|
| 1,314,279 | 8/1919 | McCrary | 61/72.2 |
| 3,205,550 | 9/1965 | Martin | 425/59 |
| 3,234,743 | 2/1966 | Levy | 175/62 X |
| 3,325,217 | 6/1967 | Enz | 175/62 X |
| 3,486,572 | 12/1969 | Hamilton et al. | 175/53 |
| 3,656,563 | 4/1972 | Blinne | 175/53 X |
| 3,894,402 | 7/1975 | Cherrington | 175/62 X |
| 4,043,136 | 8/1977 | Cherrington | 61/72.7 |

*Primary Examiner*—Dennis L. Taylor
*Attorney, Agent, or Firm*—Benjamin J. Barish

[57] ABSTRACT

Method and apparatus are described for producing underground installations of concrete pipe, in which a shaft is sunk into the ground at each of two spaced locations between which the concrete pipe is to be installed, an annular slipform-shield is disposed in one shaft, holes are bored through the ground from the other shaft to the slipform-shield, and cables are passed through the holes and are attached to the slipform-shield. The cables are then used for pulling the slipform-shield towards the other shaft while concrete is simultaneously fed to the trailing section of the slipform-shield to thereby fill the resulting void by a cast tubular layer of concrete embedded in and supported by the ground. After the cast concrete has set as a hardened tubular layer, the soil from within it may be removed.

5 Claims, 5 Drawing Figures

METHOD AND APPARATUS FOR PRODUCING UNDERGROUND INSTALLATIONS OF CONCRETE PIPE

BACKGROUND OF THE INVENTION

The present invention relates to a method of producing an underground installation of concrete pipe and to a device useful in such method.

A number of methods are known for producing underground installations of concrete pipe, such as used in underground sewage systems. On method, called the "open trench" technique, involves digging open trenches, placing therein precast concrete pipe sections which are connected together, and then filling the trench. However, there are many conditions where this techinque is not possible or not practical. In such cases, a "pipe-pushing" technique, or a "pipe-pulling" technique, may be used. In the pipe-pushing technique, shafts are sunk into the ground at two spaced locations between which the concrete pipe is to be installed, and the concrete is pushed, by means of jacks, from one shaft towards the next shaft, consecutive sections of the pipe being attached after each pushing step. In the pipe-pulling technique, two shafts are also sunk into the ground. A steel pipe of larger diameter than the concrete pipe to be laid is then pulled from one shaft to the other by means of pulling cables extending from the pipe to the other shaft, the pulling being effected in steps, with a pipe section being welded to the trailing end after each pulling step. The soil is removed from the center of the steel pipe, and a concrete pipe is then laid within it, the outer steel pipe thereby serving as a liner. In another pipe-pulling techinque, a shield is disposed in one shaft and is pulled towards the other shaft by means of the pulling cables. As the shield is pulled through the ground, steel plates are attached after each pulling step to form a tunnel liner section extending the distance of the pulling step; and after the complete span has been thus lined, a pipe, for example of steel or concrete, is installed within the liner.

OBJECTS AND SUMMARY OF THE PRESENT INVENTION

An object of the present invention is to provide a method of producing an underground installation of concrete pipe having advantages over the above-discussed known methods. Another object of the invention is to provide a slipform-shield device particularly useful in the novel method.

According to a broad aspect of the present invention, there is provided a method of producing an underground installation of concrete pipe, comprising: sinking a shaft into the ground at each of two spaced locations between which the concrete pipe is to be installed; disposing in one shaft a slipform-shield device having an annular cutting section on the side facing the other shaft, and an annular trailing section on the opposite side; passing pulling cables through the ground from said other shaft to the slipform-shield device and attaching said cables to the slipform-shield device; pulling, by means of said pulling cables, the slipform-shield device towards said other shaft while simultaneously feeding concrete to said trailing section to thereby fill the resulting void by a cast tubular layer of concrete embedded in and supported by the ground; permitting the cast concrete tubular layer to set; and removing the soil from within said cast concrete tubular layer.

Slipforms are well known in the slipform technique for casting concrete, for example in producing large vertical concrete structures, wherein the forms (sometimes called shutterings or mould plates) are caused to slip along the concrete as the latter is cast between them, rather than being repeatedly disassembled and reassembled during the casting of the complete structure.

According to another aspect of the invention, there is provided a slipform-shield device for use in the above method and comprising an annular cutting section on one side of the divice, an annular trailing section on the opposite side of the divice, and a passageway for feeding concrete to said trailing section.

It will be seen that the novel method has a number of advantages over the above-discussed known methods. Thus, it can be used where the "open-trench" technique is not possible or practicable. It requires considerably less power than the pipe-pushing or pipe-pulling techniques discussed above since the friction to be overcome in pulling the slipform-shield device through the complete length of the span to be covered is substantially less than that required in pushing or pulling the pipes, particularly at the end of the span where the friction of the complete pipe length is considerable. In addition, the novel method is much less expensive and uses less material than the pipe-pulling techniques since there is no need to form the liner. Further, the novel techinque is considerably faster than the known pipe-pulling techniques since the concrete may be cast as fast as the shield can be pulled; it is not necessary to wait for the concrete to set before continuing with the casting operation, as the ground itself in which the concrete is embedded supports the concrete until it does set. After the concrete does set, the soil within the tubular layer of concrete can be removed by a crew as fast as desired.

Further features and advantages of the invention will be apparent from the description below

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
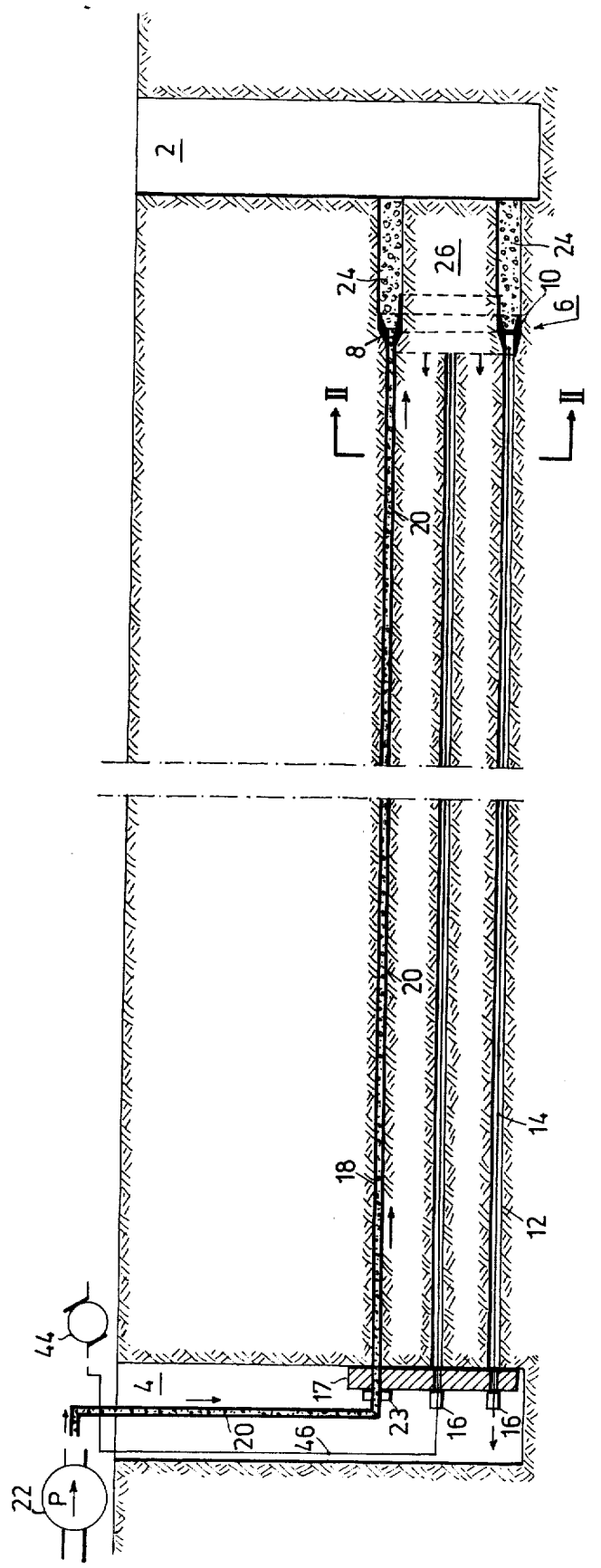
FIG. 1 illustrates one applicatin of the invention for installing concrete pipe underground.

With reference to FIG. 1, two shafts or pits 2 and 4 are sunk into the ground at two spaced locations between which the concrete pipe is to be installed. Disposed within one of the shafts (shaft 2) is a slipform-shield device generally designated 6, having an annular cutting section 8 on the side facing the other shaft (shaft 4), and an annular trailing section 10 on the opposite side. The construction of the slipform-shield is better illustrated in FIGS. 2 and 3 described below. A plurality of holes 12 are bored through the ground from shaft 4 to the slipform-shield device 6, and pulling cables 14 are passed through these holes and are attached at one end to the cutting section 8 of the slipform-shield device 6. The opposite ends of cables 14 are attached to a plurality of jacks 16 disposed within shaft 4 and acting against a jacking frame 17 placed against the inside wall of the shaft. At least one further hole 18 is bored from shaft 4 to the slipform-shield device 6, this further hole receiving a concrete feed tube 20 extending, from a concrete pump 22 disposed above ground adjacent to shaft 4, through the cutting section 8 to the trailing section 10 of device 6.

After the foregoing preparations have been made, the slipform-shield device 6 is pulled by means of the jacks 16 and the cables 14 towards shaft 4 while concrete is simultaneously pumped via feed tube 20 to the trailing section 10. A further jack 23 acts to withdraw the feed tube 20 at the same rate as device 6 is pulled by cables 14. The void, resulting from the displacement of the soil by the slipform-shield device 6, is thus filled with a cast tubular layer 24 of concrete embedded in and supported by the ground. After the cast concrete layer 24 has set, the soil 26 from within it is removed, for example by crews digging it out, to thereby produce an underground installation of concrete pipe suitable for use in a sewage system, for example.

The manner of boring the holes 12 through the ground from shaft 4 to the slipform-shield device 6, of attaching the pulling cables 14 to device 6, and of using the pulling jacks 16 for pulling device 6 towards shaft 4, are all well known in the conventional pipe-pulling techniques briefly described above. However, the conventional pipe-pullng technique involves first the construction of a liner, and then the laying of the pipe within the liner. This is not involved in the novel method of the present invention, wherein the pulling of the shield is accompanied by the simultaneous pumping of concrete via the feed tube 20 to the trailing section 10 of device 6 so as to fill the resulting void by a tubular layer of concrete 24. As noted above, this tubular layer of concrete is embedded in and supported by the ground from all sides, including the soil 26 within it, so that additional support is not necessary to permit the concrete to set in the tubular condition in which it is cast. After casting, the tubular layer of concrete 24 may be permitted to set for the appropriate period of time, for example two weeks or longer, and then the soil 26 from the interior of the tubular layer 24 may be removed by digging crews working as fast as desired since they are protected by the set concrete tube 24 during this operation.

A finished concrete pipe is thus produced without the need to provide liners or the like characterised in the above-discussed known pipe-pulling techniques.

Figure 2:
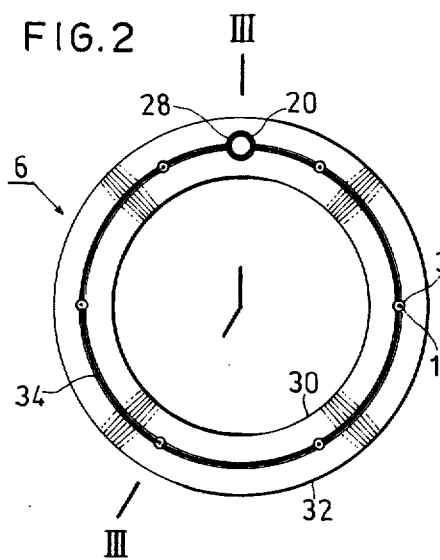
FIG. 2 is a sectional view along line II—II of FIG. 1 particularly showing the construction of the slipform shield device used in the method of FIG. 1.
Figure 3:
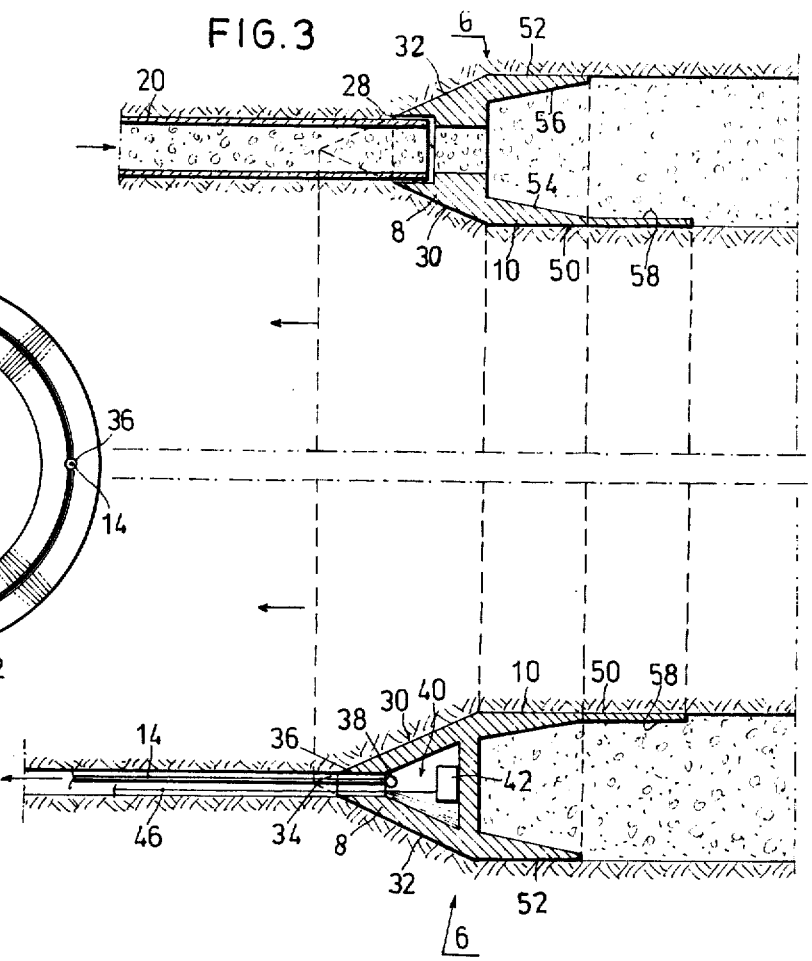
FIG. 3 is a section along lines III—III of FIG. 2, particularly showing the manner of introducing the concrete into the slipform-shield device, and the manner of attaching the pulling cables to the slipform-shield device.

The structure of the slipform-shield device 6 is more particularly illustrated in FIGS. 2 and 3. As shown particularly in FIG. 2, this device is of annular shape, the pulling cables 14 being attached to the side illustrated in FIG. 2 (this being the cutting section 8 face) at a plurality of spaced points along the circumference of the device. The concrete feed tube 20 passes through a passageway 28 at the upper end of the device so as to communicate with its opposite side, namely that of the trailing section 10.

As shown particularly in the lower part of FIG. 3, the cutting section 8 of the slipform-shield device 6 includes a pair of annular walls 30, 32 converging towards each other at the leading edge 34. The pulling cables 14 are attached to the cutting section by being passed through openings 36 formed through leading edge 34, the cables having, or being attached to, enlarged heads 38 disposed within a hollow space or compartment 40 formed in the cutting section 8. One or more vibrator units 42 are disposed within space 40 and are connected via electrical conductors 46, included along side of at least one of the pulling cables 14, to a power supply 44 (FIG. 1) disposed above ground near shaft 4. Vibrator 42 is operated during the pulling of the slipform-shield device and the casting of the concrete in the produced void, and facilitates not only the casting of the concrete, but also of the cutting of the slipform-shield device through the ground as it is pulled.

As shown particularly in the upper part of FIG. 3, the trailing section 10 of device 6 is defined by a pair of coaxial spaced annular walls 50, 52, between which the concrete is fed from feed tubes 20. The confronting faces 54, 56 of walls 50, 52 diverge away from each other to facilitate the discharge of the concrete in the space between the two walls. In addition, the outer annular wall 52 is of shorter length than the inner annular wall 50, the latter being provided with an extension 58 tending to smoothen the inner face of the cast concrete as it is discharged into the void produced by the slipform-shield device 6.

Figure 4:
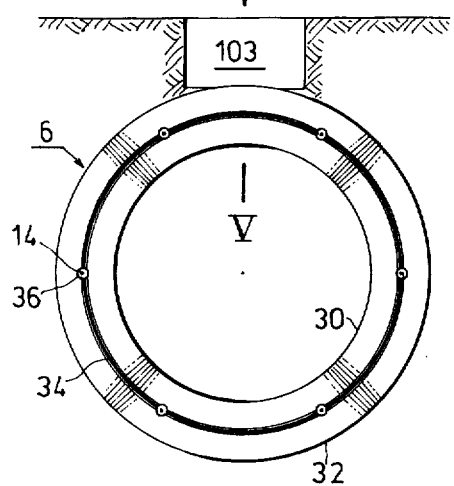
FIGS. 4 and 5 are sections corresponding to FIG. 2 and the upper part of FIG. 3, respectively, illustrating a modification in the method and the slipform-shield device used.
Figure 5:
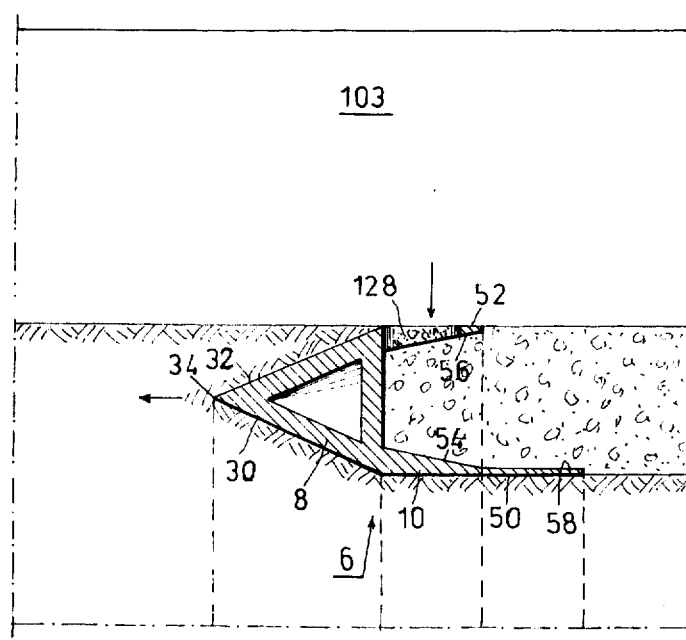

FIGS. 4 and 5 illustrate a modification in the method, and also in the slipform-shield device used, which modification is particularly applicable when the concrete pipe is to be installed close to the surface of the ground such that digging a trench for feeding the concrete is practical. FIGS. 4 and 5 illustrating this modification, are sectional views corresponding to FIG. 2 and the upper part of FIG. 3, respectively. To facilitate understanding FIGS. 4 and 5, the same reference numerals have been used for those parts which are the same as in FIGS. 2 and 3, new reference numerals, starting with "100", being used for the new parts or elements.

Thus, as shown in FIG. 4, the concrete feed tube 20 is omitted, and instead, a trench 103 is dug between the two shafts (2, 4, FIG. 1) to the depth of the annular trailing section 10 (FIG. 5) of the slipform-shield device. FIG. 4 particularly illustrates the leading cutting section (8) of the slipform-shield device, including its leading edge 34 and the openings 36 receiving the pulling cables 14.

As indicated above, the concrete feed tube 20 and the passageway 28 through which it passes so as to communicate with the trailing section 10 of the device, are both omitted, as the concrete is fed to the trailing section via trench 103. This can be conveniently done by having a concrete truck (not shown) travelling along the trench to feed the concrete into it. The concrete passes through the opening 128 formed in the outer annular wall 52 into the space between the latter wall and the inner annular wall 50.

The construction of the slipform-shield device in the modification of FIGS. 4 and 5 is otherwise the same as described in respect to FIGS. 1–4. The manner of using the device for producing the underground pipe installation is also the same as described above with respect to FIGS. 1–3, except that instead of pumping the concrete through the feed tube 20, the concrete is fed via the trench 103 and passageway 128 into the space between the two annular walls 50, 52 of the trailing section of the slipform-shield device as the latter is pulled by the cables 14.

While the invention has been described with respect to two preferred embodiments, it will be appreciated that many variations, modifications, and other applications may be made.

What is claimed is:

1. A method of producing an underground installation of concrete pipe, comprising: sinking a shaft into the ground at each of two spaced locations between which the concrete pipe is to be installed; disposing in one shaft a slipform-shield device having an annular cutting section on the side facing the other shaft, and an annular trailing section on the opposite side; passing pulling cables through the ground from said other shaft to the slipform-shield device and attaching said cables to the slipform-shield device; pulling, by means of said pulling cables, the slipform-shield device towards said other shaft while simultaneously feeding concrete to said trailing section to thereby fill the resulting void by a cast tubular layer of concrete embedded in and supported by the ground; permitting the cast concrete tubular layer to set; and removing the soil from within said cast concrete tubular layer.

2. The method according to claim 1, wherein, during the pulling and casting operation, the slipform-shield device is vibrated by means of a vibrator carried thereby.

3. The method according to claim 1, wherein the slipform-shield device is pulled by means of jacks disposed within said one shaft and connected to said pulling cable.

4. The method according to claim 1, wherein a concrete feed tube is passed through the ground and through said cutting section to the trailing section of the slipform-shield device, the concrete being fed via said feed tube.

5. The method according to claim 1, wherein a trench is dug from the two shafts to the depth of the annular trailing section of the slipform-shield device, the concrete being fed via said trench.

* * * * *